Dec. 25, 1951      G. E. FREUND      2,579,661
LIGHT MEASURING METER
Filed April 28, 1949
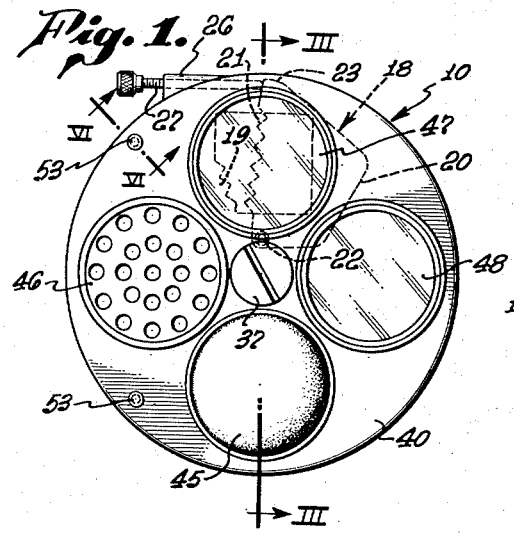
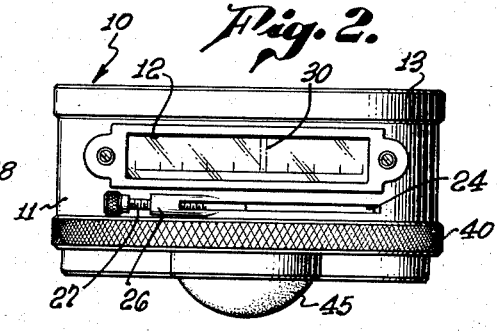
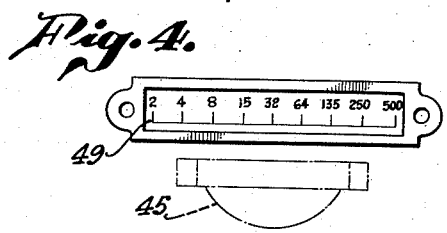
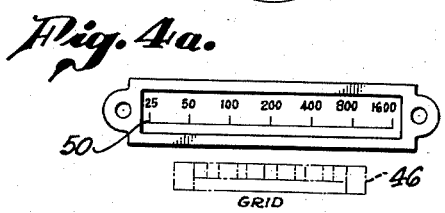
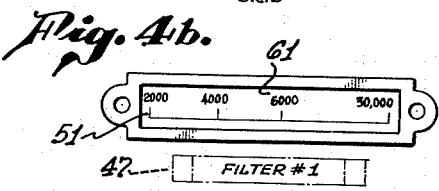
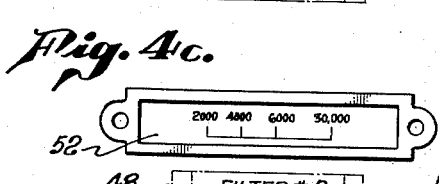
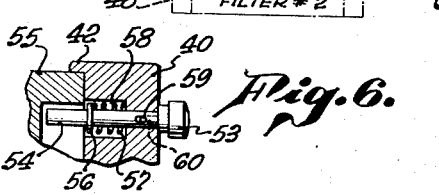
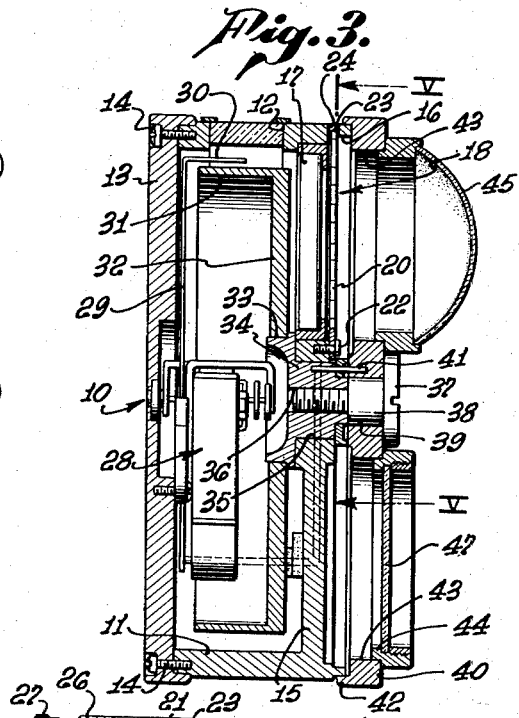
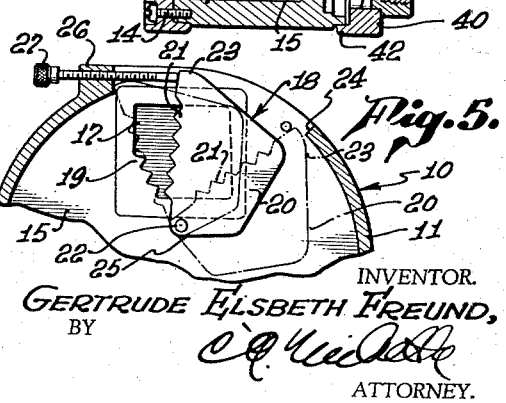
INVENTOR.
GERTRUDE ELSBETH FREUND,
BY
ATTORNEY.

Patented Dec. 25, 1951

2,579,661

UNITED STATES PATENT OFFICE 2,579,661

LIGHT MEASURING METER

Gertrude Elsbeth Freund, San Fernando, Calif., assignor to Photo Research Corporation, San Fernando, Calif., a corporation of California Application April 28, 1949, Serial No. 90,074

5 Claims. (Cl. 88—23)

This invention relates to an improved multi-purpose or compound meter for use in illumination engineering and the photographic arts especially designed for readily and accurately determining several characteristics of light being examined such as the amount of light, the color temperature of the light source, and the spectral characteristics of light emitted from the light source. This invention contemplates a compound meter wherein the above characteristics are determined by one instrument utilizing a single photoelectric or light responsive cell.

In order to obtain an accurate photographic rendition of a subject, it is very important that the photographer should be able to measure the amount or aggregate of light under which this subject is exposed. The aggregate of light may comprise light reflected from the surfaces of the subject being photographed and light which falls upon the subject. The latter kind of light is referred to as "incident" light and the former kind of light is referred to as "reflected" light.

It is important for the photographer to be able to separately measure both the incident and reflected light. Exposure meters which measure only the reflected light usually give a reading which is an average of the sum of different values of light reflected from the surface of the subject. This average may be inaccurate and may not give the best exposure for photographic rendition of the subject with respect to the type of film being used. When the photographer can measure both the incident light and the reflected light, he may then select a proper exposure for the particular type of film being used. In outdoor photography it is important that the exposure be determined accurately and rapidly because the character of light is constantly changing.

In addition to measuring incident and reflected light to determine proper exposure of film being used, when color-sensitive film is employed to obtain colored photographs it becomes necessary to know, at the same time that exposure values are determined, the particular color characteristics of the light source. Light which has the same intensity may vary quite widely in its color temperature or spectral composition. The color temperature of light is usually measured in degrees Kelvin, which is a measure of the temperature to which a "black body" must be raised to have the same color as the light in question.

Since the color-sensitive film is made for use under light conditions having virtually the same color temperature as that for which the film is designed, the importance of determining color temperature of the light source in order to obtain a true color rendering on the ultimate photograph becomes readily apparent. Once the color temperature of the light source is determined, a photographer may then select a specific color-sensitive film which will match the color temperature of the light, or he may compensate for the variation between the color temperature of the light source and the color temperature for which the light-sensitive film is designed by the use of selected filters, by supplementing the light source with light modifying the characteristics of the initial light source, or by modifying the voltage of the light source being used.

It will be readily apparent in color photography that it is highly important that color temperature be accurately and quickly determined, together with the proper exposure in order that the color-sensitive film may be exposed under conditions which will give the best color rendering.

In indoor color photography, the source of light is usually one which has a continuous spectrum such as incandescent lamps. With this type of radiation specification of color temperature completely defines the relative amounts of radiation at every wavelength throughout the spectrum. New, more efficient light sources are coming into use, such as a vapor discharge lamp wherein the light emitted from the vapor lamp has a discontinuous line spectrum.

When a vapor discharge lamp is used as a light source it becomes necessary to determine the spectral characteristics of this light. Since this light has characteristics of a discontinuous line spectrum, it is important to know distribution of specific wave length bands of light between the extremities of the spectrum. Usually a metallic vapor is introduced into the lamp to correct any deficiency in the distribution of the light over the spectrum. Since the quantity of introduced metallic vapor is constantly changing, the amount of a particular kind of light emitted thereby must be determined in order to insure that the spectral composition of the light is still within the tolerances of the particular selected color-sensitive film. It will thus be readily apparent that when working with a light source emitting a discontinuous line spectrum, it is necessary to frequently examine the light source so that a true color rendering will be obtained in the developed film.

It will be readily apparent to those skilled in the art that measurement or determination of the quantity of light, color temperature, and spectral characteristics of light have been made by prior proposed separate instruments which were capable of determining only one of the characteristics above noted. In other words, various types of proposed exposure meters have been designed for the purpose solely of measuring the amount of light reflected or falling upon a photographic subject in order to determine the proper exposure for the film used. Also other separate devices have been proposed for determining the color temperature of light and the spectral characteristics of light.

This invention has for its primary object the provision of a compound meter embodied in a single instrument and utilizing a single light-responsive cell which is capable of quickly and accurately determining and measuring the amount of light, color temperature, and spectral characteristics of light being examined.

Another object of this invention is to provide a compound meter for use in illumination engineering and the photographic arts which is relatively inexpensive because of the use of a single photoelectric cell which is so utilized as to afford measurement of several characteristics of light.

A further object of this invention is to provide a meter as above described wherein scales are correlated to various light-modifying means for direct reading of a particular characteristic of light which it is desired to measure.

Still another object of this invention is to design and provide a simple, compact, inexpensive meter for use in photography which is capable of determining exposure, color temperature, and spectral characteristics of light being examined and of giving a direct reading for obviating the use of computers or tables.

Another object of this invention is to provide a composite meter as described above, wherein means are provided for automatically moving adjustable light-limiting or diaphragm means into fully open position when a light-collecting member and light-transmitting member are positioned in front of a light-responsive cell. Generally speaking, the composite meter contemplated by this invention includes a cylindrical hollow housing having a window opening in its circumferential wall and having a front end wall with a light-admitting port. A variable area, serrated diaphragm means is pivotally mounted beneath the port for limiting the amount of light admitted to a light-responsive cell operatively positioned within the housing with respect to the port. A carrier member is revolvably mounted about the axis of the housing and carries a plurality of light-modifying elements which may be operatively positioned in front of the cell by rotation of the carrier.

A scale-carrying drum, operatively connected to the carrier members is rotatable within the housing in alignment with the window opening for moving a scale correlated to a selected light-modifying element into visible readable position when the selected light-modifying element is operatively positioned. The plurality of light-modifying elements may include a light-collecting member, a light-transmitting member and selected filters whereby reflected and incident light may be determined and color temperature and spectral characteristics of the light source may be determined.

Other objects and advantages of this invention will be readily apparent to those skilled in the art from the following description of the drawings.

In the drawings:

Fig. 1 is a front view of a meter embodying this invention;

Fig. 2 is a top plan view of the device shown in Fig. 1;

Fig. 3 is an enlarged sectional view taken in a plane bisecting the meter as indicated by the line III—III of Fig. 1;

Fig. 4 is a fragmentary view of a scale correlated to a light-collecting member indicated in diagrammatic lines, Fig. 4a is a similar view with a different scale correlated to a light-transmitting member, Fig. 4b is another view of a scale in degrees Kelvin correlated to a selected filter and Fig. 4c is a different view of another scale correlated to a different filter;

Fig. 5 is a fragmentary sectional view taken in the plane indicated by the line V—V of Fig. 3 and shows an arrangement of the light-limiting means, and Fig. 6 is a fragmentary view of a diaphragm opening pin used in connection with two of the light-modifying elements.

Referring particularly to Fig. 1, a composite or multi-purpose meter generally indicated at 10 comprises a cylindrical hollow housing 11 having a top window opening 12 formed in its circumferential wall. Covering one end of the housing may be a rear wall 13 secured to the housing by a plurality of circumferentially spaced stud bolts 14. At its other end the housing is provided with an integral front wall 15.

Radially spaced above the axis of housing 11 and formed in front wall 15 is a generally circular light-admitting port 16. A light-responsive cell 17 is suitably mounted within the housing in alignment with the light-admitting port 16. The light-responsive cell 17 may be any suitable photoelectric cell as for example a photo-conductive, semi-conducting or barrier-layer selenium or copper oxide photovoltaic, photronic or other types.

The cell 17 is illustrated as having a square or polygonal shape, although any form or shape of cell may be utilized. Between the cell 17 and the light-admitting port 16 is provided a light-limiting or diaphragm means generally indicated at 18. The diaphragm means 18 includes a fixed, thin sheet-like opaque, serrated or toothed triangular portion 19 secured to the housing and lying adjacent one side of the cell. Cooperating with the fixed portion 19 is an opaque, polygonal spring-biased portion 20 having one edge serrated as at 21 for cooperatively matching the serrated edge on portion 19 to permit a variable area, sector-shaped, relatively fine adjustment of light admitted to the cell. The portion 20 is pivotally mounted by a pin 22 secured to the front wall above the axis of the housing for providing a shorter radius of arc for the polygonal portion 20 than the radius of the housing.

A radial extremity 23 of portion 20 moves within a slot 24 formed within the top circumferential wall margin of the housing when portion 20 is positioned in front of the cell. When portion 20 is revolved to a completely open position by means hereinafter described, the radial extremity 23 may move within the housing beyond the end of slot 24 because of its shorter radius, as best seen in Fig. 5.

A spring 25 carried on pin 22 cooperatively engages portion 20 for normally urging portion 20 into closed position with fixed portion 19.

A shoulder 26 integrally formed on the upper cylindrical wall of the housing is provided with a threaded bore for threadedly engaging an adjustable setscrew 27 having one end adapted to contact the radial extremity 23 when the portion 20 is in closed or partially open position. Manual operation of setscrew 27 thus changes the size of the variable area, sector shaped opening as desired.

The light-responsive cell 17 may be operatively connected with a suitable microammeter, milliammeter, microvoltmeter, or millivoltmeter, generally indicated at 28 for actuation of a pivotally mounted index or needle 29 within the housing. The needle 29 is provided with an end portion 30 disposed parallel to the axis of the housing for overlying a flanged scale-carrying face 31 of scale-carrying means or drum 32, said end portion 30 and scale-carrying face 31 being visible through window 12.

The scale-carrying drum 32 may be fixedly mounted in any suitable manner as at 33 on an enlarged inner shoulder of a stepped stub shaft 34 journaled in an axial opening 35 in the front wall 15. The shaft 34 is axially bored at 36 for threaded engagement with a retaining stud bolt 37.

The stud bolt 37 is provided with an enlarged bearing or shank portion 38 for abutment at 39 of its inner annular edges with opposed outer annular edges on the stub shaft 34 and for coaxially carrying a carrier member 40. The abutment at 39 together with contact of the head of the stud bolt 37 against the hub of the carrier member 40 axially positions the carrier member with the housing.

The carrier member 40 and the scale-carrying drum 32 are cooperatively connected by a longitudinally disposed pin 41 carried in aligned bores therein for providing simultaneous rotation of drum 32 and carrier member when the carrier member is manually rotated. The generally disk-shaped carrier member 40 may be provided with a rearwardly directed circumferential lip 42 overlying the forward circumferential margin of the housing for preventing transmission of light between the housing and the carrier member. The carrier member 40 is provided with a plurality of generally circular ports 43 equally radially spaced from the axis of the carrier member for registration of each port 43 with the light-admitting port 16.

The ports 43 in the carrier member are adapted to provide removable mounting in usual manner of various and several light-modifying elements, each of said elements being provided with a usual mounting flange 44 for permitting snug fitting of an element within a port 43.

As illustrated in the drawing, the light-modifying elements may include a light-collecting member 45 of generally partially spherical or convex shape for use in measuring incident light. The light-collecting member 45 is preferably made of any translucent, frosty, milky or white material such as a thin cellulosic or plastic material.

A grid or lenticular member 46 is mounted in an adjacent port 43 for the purpose of measuring reflected light, said grid being perforated and calibrated so that the amount of light transmitted through the perforations with relation to the light-sensiive area of the cell is accurately known. On the other two ports 43 may be mounted selected light filters of well-known form and make, illustrated here as being a red filter 47 and a green filter 48. Each of the light-modifying elements are readily removable and may be replaced with other selected and desired light-modifying elements such as various light filters used in photography.

It will be noted from a consideration of Figs. 4, 4a, 4b, and 4c that the scale-carrying drum 32 is provided with a specific scale having suitable indicia thereon correlated to a specific light-modifying element. As illustrated in Fig. 4, scale 49 carries indicia correlated to the light-collecting member 45 for giving a direct reading of the amount of incident light falling upon a photographic subject. In Fig. 4a, scale 50 is provided with suitable indicia correlated to the light-transmitting member or grid 46 for giving a direct reading of the light reflected from the subject.

Fig. 4b includes a scale 51 having indicia thereon in degrees Kelvin for measuring the color temperature of a light source when used in connection with selected filters successively mounted in respective ports 43 as for example, red filter 47 and a blue filter (not shown). In Fig. 4c, scale 52 is provided with indicia in degrees Kelvin correlated to the green filter 48.

Obviously various other scales may be provided on the scale-carrying drum 32 and positioned so that they are correlated to a corresponding selected light-modifying element, such as additional different types of filters, in order that a direct reading may be obtained when the selected filter is operatively positioned with respect to the light-responsive cell.

When determining the amount of light, either incident or reflected, on a subject being examined it is preferable to have the light-limiting means or diaphragm in fully open position. To insure that the diaphragm is in such open position upon rotation of carrier member 40 to operatively position member 45 and grid 46, spring-biased pins 53 are mounted in the circumferential margin of carrier member 40 in operative relation to the light-collecting member 45 and grid 46. Such automatic diaphragm opening means are not provided for ports 43 carrying light-filtering means because normally the diaphragm opening is adjusted to a partially opened position when light filters are used.

As best seen in Fig. 6, each pin 53 has a shank 54 extending beneath the forwardly directed marginal lip 55 on the housing 11. The shank 54 carries an annular flange 56 intermediate its ends affording a seat for one end of a coil spring 57 sleeved over the shank end confined within a recess 58 in the carrier member. Adjacent its head the pin 53 is provided with a lug 59 slidable within a longitudinal slot 60 in the carrier member. In normal position, as shown in Fig. 6, the end 54 of the shank extends within the housing and is adapted to contact the radial extremity 23 of the portion 20 for moving the portion 20 clockwise about its pivotal mounting and carrying it to an open position as substantially indicated by diagrammatic lines in Fig. 5.

It will be readily apparent from a consideration of Fig. 1 that pin 53 leads the light-transmitting member 46 by a sufficient distance so that when the light-transmitting member is operatively positioned before the light-responsive cell the diaphragm portion 20 will be held in open position. As a different light-modifying element is positioned before the light-responsive cell by clockwise rotation of the carrier member about its axis, the end of shank 54 will disengage with the radial extremity 23 because of the pivotal mounting of portion 20 on a shorter radius than that of the radial spacing of pin 53 from the axis of the carrier member. The spring 25, upon disengagement of pin 53 with portion 20, will cause portion 20 to return to its preset position as defined by the setting of the setscrew 27. If the light-collecting member 45 is moved in front of the light-responsive cell, the adjacent pin 53 will contact and hold the diaphragm portion 20 in open position. If it is desired to limit the amount of light admitted to the cell when using either the light-collecting member or light-transmitting member, the pin 53 may be retracted outwardly and partially rotated so that the lug 59 bears on adjacent outer surfaces of the carrier member 40. In retracted position the end of shank 54 is withdrawn from beneath the portion of the housing defined by the ring 54 for preventing engagement of the shank with the extremity 23.

In operation, it will be readily apparent that the carrier member 40 may be quickly and easily rotated in a clockwise direction about its axis to readily position a selected light-modifying element before the light-responsive cell. A number of light measurements may thus be quickly taken so that proper exposure and proper filters may be selected for exposing the particular type of film being used. Such rapid determination of light characteristics is especially important in outdoor photography where the character of the light is subject to constant change.

When it is desired to measure incident light or the amount of light falling upon the subject under examination, the carrier member is rotated in clockwise direction until the light-collecting member 45 is operatively positioned in front of the light-responsive cell. Since the carrier member and the scale-carrying drum are operatively connected for rotation together, the proper scale is at the same time moved into readable position beneath window 12. The pin 53 in its normal position has engaged the diaphragm portion 20 for completely opening the light-limiting means. The response of the needle 29 is indicated by its movement with respect to the scale and a direct reading of the amount of incident light is obtained.

Substantially the same procedure is followed when determination of the amount of light reflected from a subject under examination is desired. In this instance the light-transmitting member or grid 46 is rotated into operative position in front of the light-responsive cell, the diaphragm is again fully opened by action of pin 53 and a direct reading is obtained from scale 50 which was automatically moved into position beneath the window upon rotation of the carrier member.

If it is desired to measure the color temperature of light being examined, port 43 carrying the red filter 47 is operatively positioned in front of the light-responsive cell. In this instance, diaphragm portion 20 is positioned according to the setting of setscrew 27. Setscrew 27 is then further adjusted to modify the amount of light admitted to the cell until index needle 29 is positioned above a reference point 61 at the center of scale 51. The red filter 47 may then be removed from port 43 and a selected blue filter (not shown) may be inserted in this port. A change in position of index needle 29 to indicia on the scale when the blue filter is positioned in front of the light-responsive cell indicates the color temperature of the light being examined in degrees Kelvin.

It will be obvious that instead of removing or replacing the red filter with a blue filter, a red filter may be provided in a different port 43 on the carrier member and a suitable similar scale in degrees Kelvin correlated with it on the scale-carrying drum. Thus, when the second filter is positioned in front of the light-responsive cell and since the light admitted by the diaphragm means has not been changed, the modified reading given by the index needle will indicate the color temperature of the light being examined.

If it is desired to examine the spectral characteristics of a light source such as a vapor discharge lamp having a discontinuous line spectrum and in particular, a specific wave length band, the steps in obtaining the color temperature as above described are followed; that is, by placing a red filter in front of the light-responsive cell, limiting the light by the diaphragm means until the needle is on the reference point, and then replacing the red filter with a blue filter to modify the light admitted for direct reading of the color temperature of the light. After the color temperature is thus obtained, the carrier member may be rotated so that a selected green filter 48 is operatively positioned in front of the cell and at the same time scale 52 is moved into rotatable position beneath the window 12.

It will be that scale 51 and scale 52 are provided with reference points at central points on the scale. When the green filter 48 is thus placed in operative position, a change in the position of the index needle caused thereby is indicative of the spectral characteristics of the specific wave length band being examined. If the needle varies its position from that obtained on the color temperature reading the amount of green light in the discontinuous line spectrum of the light source being examined is different than that needed to give a properly balanced color reproduction on color film balanced for that particular color temperature.

It is obvious that other specific wave length bands of a discontinuous line spectrum may be analyzed by the provision of a suitable scale on the scale-carrying drum and the insertion of a suitable pre-selected filter in a corresponding port 43 on the carrier member. The filter-cell combinations may be balanced to correspond to the sensitivities of the three layers of a color film thus reading directly whether a spectrally continuous or discontinuous light source has the proper distribution for use with that film and the scales can be calibrated to read what correcting filters, if any, need to be used; or the filter-cell combinations may be such that they correspond to the three color sensitivities of the average human eye and the meter scales read directly in relative tristimulus coordinates, X, Y, Z. Although only four ports 43 are shown formed in the carrier member 40 it is obvious that a greater number of ports of smaller diameter may be readily formed therein to permit the carrying of a greater number of light-modifying elements; likewise, the scale-carrying drum may be provided with a greater number of scales around its flanged face 31 to correspond with the increased number of light modifying elements.

If desired, the light-collecting member 45 and grid 46 may each be provided with a built-in perforated disk or mask for modulating very strong light and thus permit employment of a very sensitive milliammeter or microvoltmeter. The area of perforations in such masks may bear a selected ratio to the total areas of the associated member 45 and grid 46 so that the scale readings may be multiplied by a predetermined factor.

It will be obvious to those skilled in the art that the multi-purpose photometer disclosed by this invention permits the determination of a plurality of specific characteristics of light being examined in a minimum of time and yet provides an accurate, easily read measurement of the specific characteristics sought. The instrument is of compact and simple construction and is inexpensive because it utilizes a single photoelectric cell.

It will be readily understood that the modification of the invention described above is illustrative only and that modifications and changes thereto coming within the spirit of this invention are intended to be limited only by the scope of the appended claims.

I claim:

1. A compound meter for use in illumination engineering and in photography comprising: a cylindrical housing having front and rear walls and a window opening in its circumferential wall; a light-admitting port in the front wall radially spaced from the axis of the housing; a light-responsive cell within the housing in operative relation to the port; light-limiting means between the light-responsive cell and the light-admitting port; a rotatable drum within the housing and a rotatable carrier member externally of the housing coaxially mounted with respect to the housing and fixed for simultaneous rotation together; said carrier member having a plurality of light-modifying elements mounted thereon around the axis of said member for selective positioning in front of said light-admitting port, said rotatable drum having a scale-carrying flanged face visible through said window opening for reading a scale thereon, each scale being correlated to a light-modifying element operatively positioned with respect to the port; an index needle operatively associated with said cell and movable with respect to the scale positioned beneath the window; and means on the carrier member to engage means on the light-limiting means for automatically moving the light-limiting means into fully open position when certain of the ports are moved into operative relation before the light-admitting port.

2. A compound meter for measuring intensity, color temperature and spectral composition of a light source comprising: a cylindrical housing having front and back walls and a side wall provided with a window opening; a light admitting aperture on the front wall radially spaced from the axis of the housing; a light-responsive cell and a response indicating meter within the housing, said cell being in operative relation to the aperture; a selectively adjustable light limiting means carried by the housing in operative relation to the cell; a shaft journaled in the front wall; a circular carrier fixed to the shaft for movement externally of the front wall, said carrier having a plurality of ports circularly surrounding the axis of the carrier, each port being arranged for alignment with the light admitting aperture, said plurality of ports being adapted to removably carry selected light modifying elements, said elements including a grid to receive reflected light, a light collecting member to receive incident light, and filters capable of transmitting selected wave length bands spaced on the spectrum for determining color temperature and spectral composition; a scale carrying drum fixed on the shaft within the housing for simultaneous rotation with the carrier, said scale carrying drum having a flanged face provided with a plurality of circumferentially spaced sets of indicia correlated with spacing of the plurality of ports and the character of the light modifying elements associated with said ports, said sets of indicia being selectively viewed through the window; and an index carried by the meter and extending between the scale carrying drum and window.

3. A compound meter for use in illumination engineering and in photography, comprising: a housing having front and back walls, and side walls provided with a window opening; a single light-admitting port in the front wall; a light-responsive cell and a response-indicating meter within the housing, said cell being in operative relation to the port; a selectively adjustable light-limiting means carried by said housing in front of the cell to limit light admitted thereto; a circular carrier member coaxially mounted with the housing for movement externally of the front wall of the housing; said carrier member having a plurality of ports circularly arranged around its axis, each being selectively positionable before the light-admitting port, said ports being adapted to removably carry selected light-modifying elements; a scale-carrying drum coaxially mounted with the circular carrier member and disposed for movement in a plane normal to its axis and connected for simultaneous rotation to the carrier member, said scale-carrying drum having a flanged face provided with a plurality of selected sets of indicia spaced in correlation with the spacing of the ports in the carrier member for selected viewing through the window; each set of indicia being selected for cooperation with a light-modifying element; an index carried by the meter and extending between the scale-carrying drum and window; and means on the carrier member associated with certain of said scales and correlated ports and light-modifying elements for automatically moving the light limiting means into fully open position upon positioning certain of the ports before the light-admitting port.

4. A compound meter for use in illumination engineering and in photography, comprising: a housing having front and back walls, and side walls provided with a window opening; a light-admitting port in the front wall; a light-responsive cell and a response-indicating meter within the housing, said cell being in operative relation to the port; a selectively adjustable light-limiting means carried by the front wall in front of said cell; a carrier mounted for movement over the front wall of the housing; and a scale member supported from said front wall and operably connected to the carrier for simultaneous rotation therewith and positioned within the housing in proximity to the window opening; said carrier having a plurality of spaced ports circularly arranged with respect to the axis of the housing, each provided with a different light-modifying element, arranged for selective positioning in alignment with the light-admitting port in the front wall of the housing, said scale member carrying a plurality of separate sets of indicia in spaced, aligned relation correlated to the spacing of the ports in the carrier and to the light-modifying elements carried thereby, said indicia being selectively viewable through the window in the housing; and an index carried by the meter and extending between the scale member and window.

5. A compound meter as defined in claim 2, wherein said carrier member is provided with means to engage the light-limiting means when in partially closed position to move the light-limiting means into fully open position upon rotation of the carrier member, said engaging means being associated with a port carrying a selected light-modifying element correlated to a selected set of indicia.

GERTRUDE ELSBETH FREUND.

REFERENCES CITED

The following references are of record in the file of this patent:

UNITED STATES PATENTS

| Number | Name | Date |
|---|---|---|
| 2,048,655 | Hineline | July 21, 1936 |
| 2,058,562 | Bucky et al. | Oct. 27, 1936 |
| 2,278,338 | Tonnies | Mar. 31, 1942 |
| 2,330,877 | Fleischer et al. | Oct. 5, 1943 |
| 2,389,617 | Freund | Nov. 27, 1945 |

FOREIGN PATENTS

| Number | Country | Date |
|---|---|---|
| 476,875 | Great Britain | Dec. 13, 1937 |